United States Patent

[11] 3,558,932

[72] Inventor William G. Crouse
Raleigh, N.C.
[21] Appl. No. 723,814
[22] Filed Apr. 24, 1968
Division of 448,521, Apr. 15, 1965,
Patent No. 3,432,616.
[45] Patented Jan. 26, 1971
[73] Assignee International Business Machines Corporation
Armonk, N.Y.
a corporation of New York.

[52] U.S. Cl. .................................................... 307/293,
307/273, 307/288, 307/291, 328/63
[51] Int. Cl. .................................................... H03k 17/28
[50] Field of Search .......................................... 328/63;
307/272, 273, 293, 288, 291

[56] References Cited

UNITED STATES PATENTS

| | | | |
|---|---|---|---|
| 3,504,288 | 3/1970 | Ross ............................ | 328/63 |
| 3,195,056 | 7/1965 | Trautwein .................... | 307/272X |

*Primary Examiner*—John S. Heyman
*Attorneys*—Hanifin and Jancin and John C. Black

[54] DATA SHIFT CIRCUIT EMPLOYING BISTABLE AND MONOSTABLE MULTIVIBRATORS FOR PROVIDING EQUAL TIME DELAYS IN LEADING AND TRAILING EDGES OF DATA PULSES
1 Claim, 2 Drawing Figs.

ABSTRACT: An improved delay circuit provides exactly equal time delays of both the positive and negative-going changes in the bivalued data signals applied thereto with a minimum number of components and interconnections.

FIG.1b

PATENTED JAN 26 1971

3,558,932

Figure 1A:
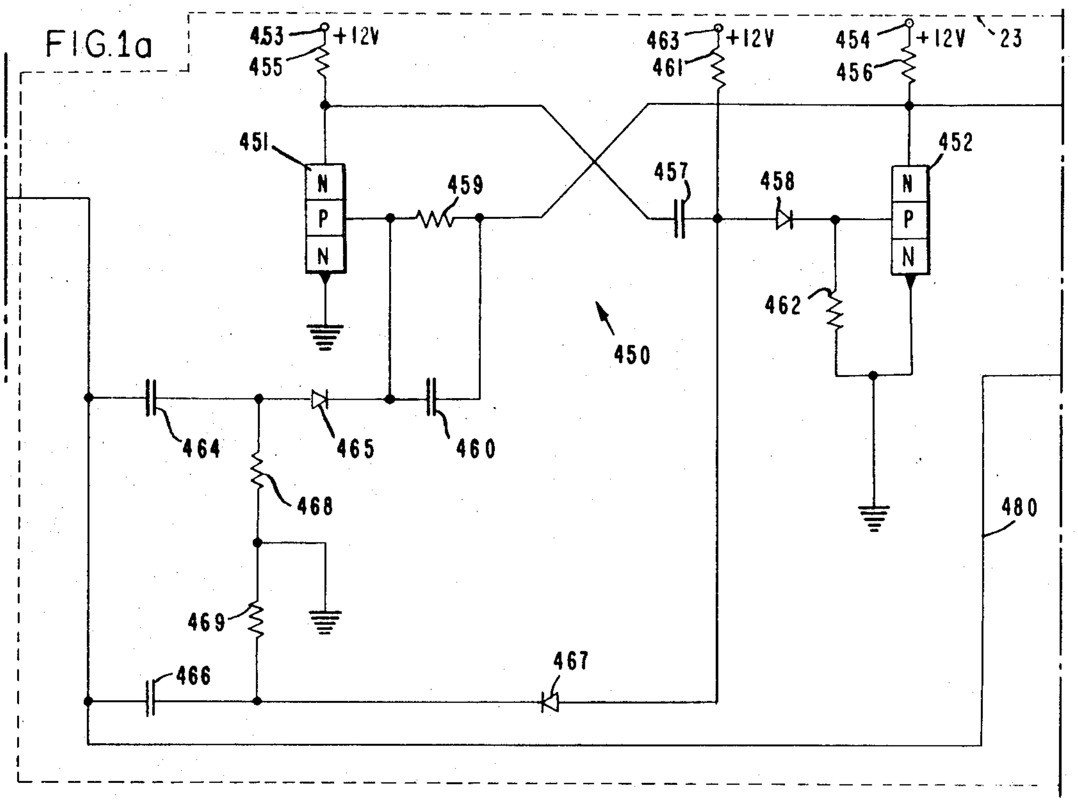
Figure 1B:
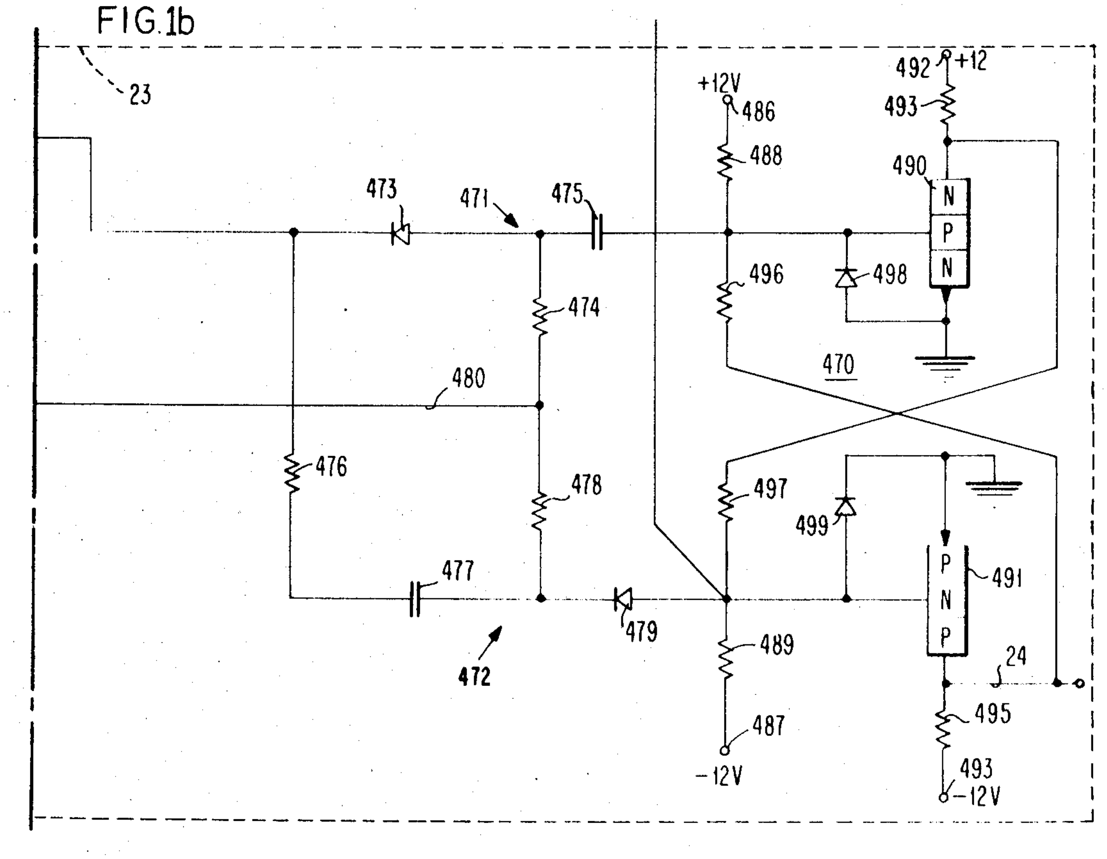

DATA SHIFT CIRCUIT EMPLOYING BISTABLE AND MONOSTABLE MULTIVIBRATORS FOR PROVIDING EQUAL TIME DELAYS IN LEADING AND TRAILING EDGES OF DATA PULSES

This application is a division of copending application of William G. Crouse, the inventor herein, Ser. No. 448,521, filed Apr. 15, 1965, now U.S. Pat. No. 3,432,616.

The various features and advantages of the invention will be apparent from the following more particular description of preferred embodiments of the invention, as illustrated in the accompanying drawings.

In the drawings:

FIGS. *1a* and *1b* are a schematic diagram of the improved delay circuit.

Input signals are applied to the delay circuit 23 by way of the conductor 480. In the preferred embodiment, these signals are delayed electrodes of the transistor 440 and the output line 24, which is by 1 millisecond.

It is important to data transmission apparatus that both the leading and trailing edges of data pulses be delayed by exactly the same time interval. This is achieved in the delay circuit 23 by the use of the monostable device 450 which includes a pair of grounded emitter transistors 451 and 452. The collector electrodes of the transistors 451 and 452 are connected to positive supply terminals 453 and 454 by way of resistors 455 and 456, respectively.

The collector electrode of the transistor 451 is cross-coupled to the base electrode of the transistor 452 by way of a capacitor 457 and a diode 458. The collector electrode of the transistor 452 is cross-coupled to the base electrode of the transistor 451 by way of a parallel-connected resistor 459 and capacitor 460.

A voltage divider comprising the diode 458, a resistor 461, and a resistor 462 is connected between a positive supply terminal 463 and ground potential to bias the transistor 452 on; and the transistor 451 is normally turned off.

The collector electrode of the transistor 440 is coupled to the base electrodes of both transistors 451 and 452. The coupling circuit to the base electrode of the transistor 451 includes a capacitor 464 and a diode 465. The coupling circuit to the transistor 452 includes a capacitor 466 and a diode 467. The junction between the capacitor 464 and the diode 465 and the junction between the capacitor 466 and the diode 467 are returned to ground potential by way of resistors 468 and 469, respectively.

When the output of the transistor 440 goes positive, a positive-going pulse is applied through the diode 465 to the base electrode of the transistor 451 to turn the latter on and the transistor 452 off. When the output of the transistor 440 goes negative, a negative transient is applied through the diode 467 to cause the transistor 452 to be turned off and the transistor 451 to be turned on.

Thus it can be seen that both the negative and positive-going transients of the output signal from the transistor 440 switch the monostable device 450 to its unstable state. The time constant of the monostable circuit 450 must be shorter than the time duration of a data bit since it must produce an output pulse from the monostable device for each positive and negative level change in the incoming signal.

These output signals of the monostable device 450 appear at the collector electrode of the transistor 452 and are at a positive level for a predetermined time interval, after each change in the input signal level.

These output signals from the monostable device 450 are applied to a bistable trigger 470 by a pair of input gate circuits 471 and 472. The gate circuit 471 includes a diode 473, a resistor 474 and a capacitor 475. The gate circuit 472 includes a resistor 476, a capacitor 477, a resistor 478 and a diode 479.

The input signals are coupled to the junction between the resistors 474 and 478 by means of the conductor 480.

The negative-going transients of the output pulses from the monostable device 450 (which occur 1 millisecond after each level change on the conductor 480) are utilized to sample the level of the input signals after each level change to determine whether they are at the logical 1 or 0 state.

When conductor 480 is relatively negative, the capacitor 477 is charged by way of the resistor 478; and the negative-going transient from the monostable device 450, which occurs 1 millisecond later, sends a negative pulse through the resistor 476 to the capacitor 477 to produce a negative pulse which forward biases the diode 479.

When a negative-going transient appears at the output of the monostable device 450, after the conductor 480 goes positive, the capacitor 475 will have been charged to a positive level and the negative-going transient will forward bias the diode 473 and cause a negative-going pulse to appear at the output of the capacitor 475.

The output terminals of the gate circuits 471 and 472 are connected to the base electrodes of a pair of transistors 490 and 491 which are connected as a bistable device. More specifically, the emitter electrodes of the transistors 490 and 491 are connected to ground potential and their collector electrodes are connected to positive and negative supply terminals 492 and 493 by way of resistors 494 and 495.

The collector electrodes of the transistors 490 and 491 are cross-coupled to the base electrodes of each other by way of resistors 496 and 497. Diodes 498 and 499 are connected across the base emitter terminals of the transistors 490 and 491 to prevent excessive reverse biasing of the base emitter junctions. The base electrodes of the transistors 490 and 491 are connected to positive and negative supply terminals 486 and 487 by way of bias resistors 488 and 489.

The transistors 490 and 491 have two stable states; either both transistors are in saturation or both are cut off.

It will be recalled that the monostable device 450 samples the input signal level appearing on the conductor 480. When the conductor 480 is relatively positive, a negative-going pulse will appear at the output of the gate circuit 471, thereby causing the transistor 490 (and the transistor 491) to be turned off in the event it is conducting.

When the conductor 480 is relatively negative, the negative-going transient from the monostable device 450 produces a negative pulse at the output of the gate circuit 472 to turn the transistor 491 (and the transistor 490) on in the event that it is off.

When the transistors 490 and 491 are conducting, the conductor 24 is at ground potential which is representative of a logical 0 condition; and, when both transistors are turned off, the line 24 is at the negative level which is representative of a logical 1 condition.

These levels appearing on the conductor 24 have been delayed with respect to the data pulses appearing on the conductor 480 by means of the 1 millisecond time delay of the monostable device 450. In the preferred embodiment, the minimum pulse width of data pulses is in the order of 1⅔ milliseconds, thus obviating errors due to the delay circuit. Since both the positive-going and negative-going changes in the input signal both actuate the same time delay device, the monostable device 450, both changes in the data signal levels will be delayed by exactly the same time interval.

This is particularly important in data transmission apparatus since many unequal delays are encountered in the transmitting and receiving apparatus as well as on the line itself; and these delays render the originally uniform bit time intervals nonuniform. Since the data bits of a given character are received serially and are sampled at equally spaced time intervals, it is important to prevent variations in the bit width and uniformity.

While the invention has been particularly shown and described with reference to preferred embodiments thereof, it will be understood by those skilled in the art that the foregoing and other changes in form and details may be made therein without departing from the spirit and scope of the invention.

I claim:

1. A circuit for delaying the positive and negative transients of bivalued input signals received over an input line by a precisely equal time interval comprising:

a monostable device having an output line, having first and second transistors with first and second conductive states and means coupling the transistors so that the first and second transistors are operated in first and second states in a stable state of the device, and having a time constant such that the output signals produced in response to the triggering of the monostable device from its stable state to an unstable state and back to its stable state are of a time duration less than the minimum time between positive and negative transients of the input signal;

first and second gate circuits;

said first gate circuit having a capacitor connected directly to the input line and a diode connecting the capacitor to the second transistor and poled to respond to each positive transient in the input signal on said line to switch the second transistor to its first state thereby switching the monostable device to its unstable state to produce an output pulse on said output line;

the second gate circuit having a second capacitor connected directly to the input line and a second diode connecting the second capacitor to the first transistor and poled to respond to each negative transient in the input signal on said line to switch the first transistor to its second state thereby switching the monostable device to its unstable state to produce an output pulse on said output line;

a bistable device having third and fourth transistors and means coupling the latter transistors so that both are returned on in one state of the bistable device and so that both are turned off in the other state of the bistable device;

third and fourth gate circuits;

the third gate circuit including a third capacitor connected to the third transistor, a resistor connecting said input line to the third capacitor and a diode connecting the output line to the third capacitor and poled to respond to the trailing edge of each output signal on the output line of the monostable device and to the input signals on the input line for causing the bistable device to be operated in one state when the input signal level is at one of said two levels; and the fourth gate circuit including a fourth capacitor connected to said output line, a resistor connected to said input line, and a diode connecting the latter resistor and capacitor to the fourth transistor and poled to respond to the trailing edge of each output signal on the output line and to the input signals on the input line for causing the bistable device to be operated in its other state when the input signal is at the other of said levels.